April 23, 1929.　　　L. E. LA BRIE　　　1,710,364

BRAKE

Original Filed Aug. 12, 1925

INVENTOR
LUDGER E. LA BRIE
BY
M. W. McConkey
ATTORNEY

Patented Apr. 23, 1929.

1,710,364

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Original application filed August 12, 1925, Serial No. 49,737. Divided and this application filed June 14, 1927. Serial No. 198,731.

This invention relates to brakes, and is illustrated as embodied in an internal expanding brake for an automobile. An object of the invention is to provide a novel and simple but efficient centering device for the friction means of the brake,—i. e., a device which resists movement of the friction means in a brake-applying direction, and which acts to return the friction means to its initial position when the brake is released.

Preferably the centering device includes a part, or parts, such as wedge members yieldingly held by a spring, acting as described above to center the friction means when the brake is released, and which is illustrated as mounted on a pin such as a pivot connecting two parts of the friction means.

The above and other objects and features of the invention, including various novel and desirable structural details, will be apparent from the following description of one illustrative embodiment shown in the accompanying drawing, in which.

Figure 1:
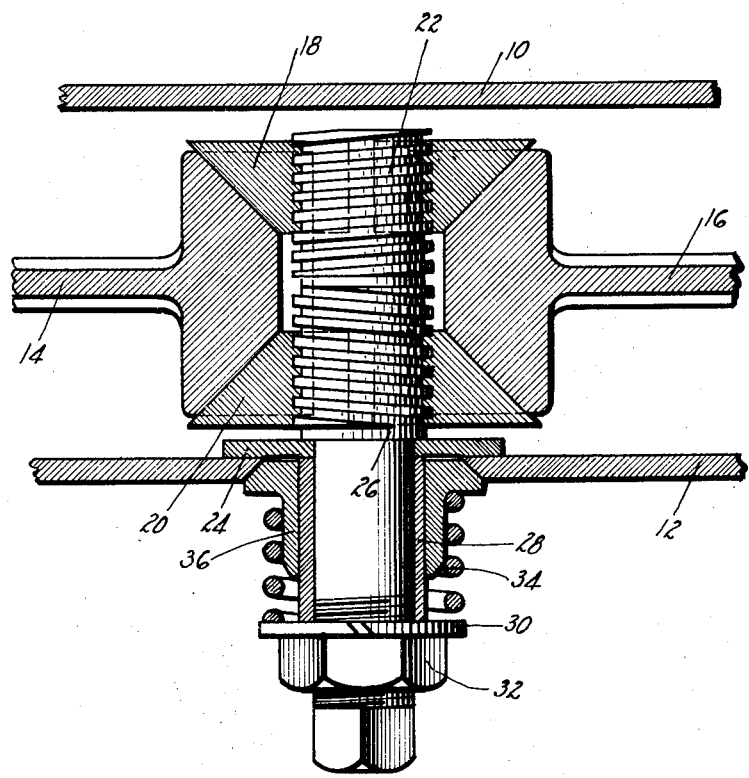
Figure 1 is a partial section through the brake, along a chord of the drum, passing through the pivot connecting the brake shoes making up the friction means of the brake.
Figure 2:
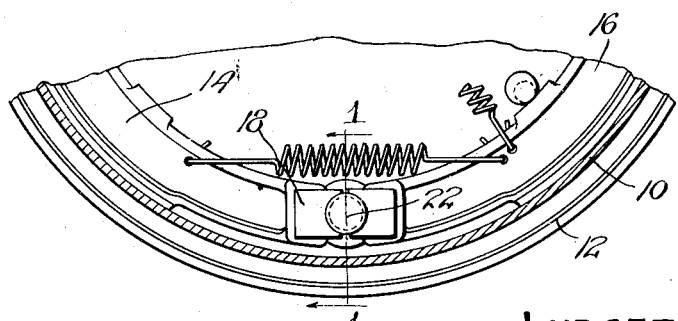
Figure 2 is a partial section taken just inside the head of the brake drum, showing substantially the same parts as Figure 1, on a reduced scale.

The invention is shown in the drawing as embodied in a brake of the type fully described in my prior application No. 49,737, filed August 12, 1925, now Patent No. 1,634,367, granted Bendix Brake Company on July 5, 1927, and of which application the present application is a division.

This brake includes a drum 10 and a backing plate 12 and, within the drum, friction means preferably including a plurality of brake shoes 14 and 16. This particular brake is of the type in which the anchorage shifts when the drum reverses its direction of rotation, the torque being taken on an anchor engaging shoe 14 when the drum is turning in one direction and on an anchor engaging shoe 16 when the drum is turning in the other direction.

The adjacent ends of shoes 14 and 16 are formed with seats for oppositely-arranged adjusting wedges 18 and 20 operated by right and left threads on a pivot pin 22 which extends crosswise of the brake and through a relatively large opening in the backing plate. The edge of this opening is beveled, so that the backing plate forms, in effect, a stationary wedge member.

The novel centering means is shown mounted on the laterally-extending part of the pin 22. In the form selected for illustration, this means includes a washer or circular member 24 seated against a collar 26 on the pin, a sleeve or stop 28 on the pin and seated against member 24, and a washer or stop 30 held against the end of sleeve 28 by a nut 32 threaded on the end of pin 22.

A coil spring 34 surrounding pin 22, and shown as sleeved on the part 28, is confined between the stop 30 and a novel wedge part 36 surrounding the sleeve 28 and having a wedge surface engaging the wedge or bevel surface of the opening in the backing plate.

It will be seen that movement of the friction means in either direction, when the brake is applied, will wedge members 24 and 36 apart against the resistance of spring 34, and that when the brake is released the spring 34 will automatically return the friction means to its initial centered position.

While one illustrative embodiment has been described in detail, it is not my intention to limit the scope of the invention to that particular embodiment, or otherwise than by the terms of the appended claims.

I claim:

1. A brake comprising in combination, friction means, and a centering device for the friction means including a pair of wedge members and means operated by the application of the friction means for wedging said members in opposite directions.

2. A brake comprising, in combination, friction means, and a centering device for the friction means including a pair of yieldingly-held members moving with the friction means and means operated by the application of the friction means for forcing said members apart in such a manner as to urge the friction means toward its original position.

3. A brake comprising, in combination, friction means, and a centering device for the friction means including a pair of wedge members and means operated by the application of the friction means for wedging said members apart.

4. A centering device for a brake comprising, in combination, a device including two wedge members, a device between said members arranged to force them apart when one of the devices is moved with respect to each other, and means yieldingly resisting the movement apart of said members.

5. A centering device for a brake comprising, in combination, a device including two wedge members, a device between said members arranged to force them apart when one of the devices is moved with respect to each other, and means yieldingly resisting the movement apart of said members, one of said devices being automatically moved with respect to the other when the brake is applied.

6. A centering device for a brake comprising, in combination, a device including two wedge members, a device between said members arranged to force them apart when one of the devices is moved with respect to each other, and means yieldingly resisting the movement apart of said members, the first device being movable with the brake when it is applied and the other being stationary.

7. Centering means for a brake which includes friction means and a backing plate provided with an opening, comprising, in combination with said means and backing plate, a part moving with the friction means and extending through the opening, a device carried by said part and wedgingly engaging the edge of the opening in the backing plate, and a spring resisting movement of said device with respect to said part.

8. Centering means for a brake which includes friction means and a backing plate provided with an opening, comprising, in combination with said means and backing plate, a part moving with the friction means and extending through the opening, a device sleeved on said part and wedgingly engaging the edge of the opening in the backing plate, and a spring confined between said device and the end of said part.

9. A brake including friction means and comprising, in combination therewith, a pin extending crosswise of the friction means, a part having an opening surrounding the pin and wedged along said pin by brake-applying movement of the friction means, and a spring resisting movement of said part with respect to the pin.

10. A brake including friction means and comprising, in combination therewith, a pin extending crosswise of the friction means, a part having an opening surrounding the pin and wedged along said pin by brake-applying movement of the friction means, and a coil spring surrounding the pin and confined at one end by said part and resisting movement of said part with respect to the pin.

11. A brake including friction means made up of separate parts having a pivot between them, and comprising, in combination with said means, a centering device carried by said pivot and moved axially along said pivot by brake-applying movement of the friction means, and a spring resisting such movement of the centering device.

In testimony whereof, I have hereunto signed my name.

LUDGER E. LA BRIE.